US010375790B2

(12) United States Patent
Daman et al.

(10) Patent No.: US 10,375,790 B2
(45) Date of Patent: Aug. 6, 2019

(54) LIGHTED CONTROL PANEL AND ILLUMINATED DISPLAY WITH EMBEDDED LIGHTING CONTROL

(71) Applicant: Spectralux Corporation, Redmond, WA (US)

(72) Inventors: Douglas W. Daman, Poulsbo, WA (US); David E. Hiney, Woodinville, WA (US); Frank E. Hummel, Woodinville, WA (US)

(73) Assignee: Spectralux Corporation, Redmond, WA (US)

( * ) Notice: Subject to any disclaimer, the term of this patent is extended or adjusted under 35 U.S.C. 154(b) by 0 days.

(21) Appl. No.: 15/914,783

(22) Filed: Mar. 7, 2018

(65) Prior Publication Data

US 2018/0263091 A1    Sep. 13, 2018

Related U.S. Application Data

(60) Provisional application No. 62/469,922, filed on Mar. 10, 2017.

(51) Int. Cl.
*H05B 37/02* (2006.01)
*H05B 33/08* (2006.01)
*H01H 13/83* (2006.01)

(52) U.S. Cl.
CPC ......... *H05B 33/0854* (2013.01); *H01H 13/83* (2013.01); *H05B 37/0218* (2013.01); *H01H 2219/038* (2013.01); *H01H 2219/039* (2013.01); *H01H 2219/044* (2013.01); *H01H 2219/062* (2013.01); *Y02B 20/46* (2013.01)

(58) Field of Classification Search
CPC ............ H05B 33/0854; H05B 37/0218; H01H 13/83; H01H 2219/038; H01H 2219/039; H01H 2219/044; H01H 2219/06
USPC ....................................................... 315/152
See application file for complete search history.

(56) References Cited

U.S. PATENT DOCUMENTS

2006/0192749 A1* 8/2006 Lowles ............... G09G 3/3406
345/102
2006/0221047 A1* 10/2006 Tanizoe ............... G09G 3/3406
345/102
2008/0248837 A1* 10/2008 Kunkel ............... G09G 3/3406
455/566

(Continued)

*Primary Examiner* — Daniel D Chang
(74) *Attorney, Agent, or Firm* — Davis Wright Tremaine LLP; Heather M. Colburn; George C. Rondeau, Jr.

(57) ABSTRACT

A control panel or display device that includes a light source, a controller, an illuminated element, a light conductor, and a light sensor. The controller generates a control signal instructing the light source when to generate light. The light conductor conducts light generated by the light source to the illuminated element to illuminate it. The light conductor receives ambient light through the illuminated element when the light source is not generating light. The light sensor receives the ambient light from the light conductor, generates a sensor signal based on the received ambient light, and sends the sensor signal to the controller. The controller determines a brightness level based at least in part on the sensor signal and encodes the brightness level in the control signal. Brightness of the light generated by the light source is based at least in part on the brightness level encoded in the control signal.

16 Claims, 5 Drawing Sheets

(56) References Cited

U.S. PATENT DOCUMENTS

2016/0172131 A1\* 6/2016 Tosh ...................... H01H 13/83
362/23.03

\* cited by examiner

LIGHTED CONTROL PANEL AND ILLUMINATED DISPLAY WITH EMBEDDED LIGHTING CONTROL

CROSS REFERENCE TO RELATED APPLICATION(S)

This application claims the benefit of U.S. Provisional Application No. 62/469,922, filed on Mar. 10, 2017, which is incorporated herein by reference in its entirety.

BACKGROUND OF THE INVENTION

Field of the Invention

The present invention is directed generally to lighted cockpit control panels and display devices.

Description of the Related Art

Cockpit control panels are often internally lighted. This light illuminates elements such as text, lines, symbols, rotary controls, switches, buttons, and keys. The lighting is adjusted by automatic means in response to ambient cockpit lighting levels. Traditionally, one or more photo optical light sensors is/are installed on the face of a control panel. Such photo optical light sensors detect ambient light levels and provide a signal to a function configured to control the brightness of the control panel.

Unfortunately, light sensors installed on the face of the control panel may be temporary obscured, cause single sample point errors, or be subjected to contamination and/or damage. Photo optical light sensors consume valuable surface area of the control panel that could be used for human machine controls. Multiple light sensors can mitigate, but do not eliminate, some of these deficiencies at the cost of consuming additional limited surface area of the control panel.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
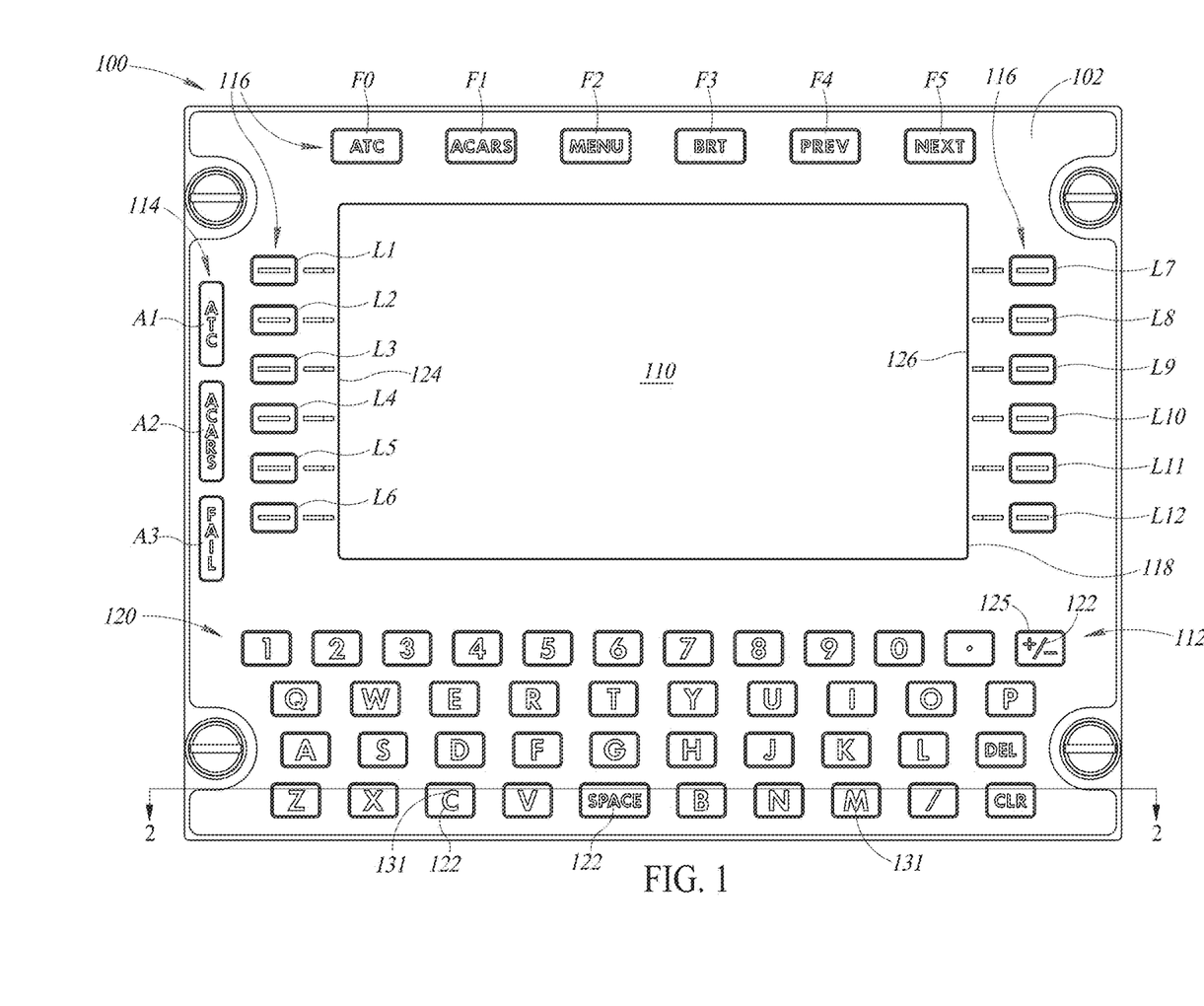
FIG. 1 is a front view of a control panel.
Figure 4:
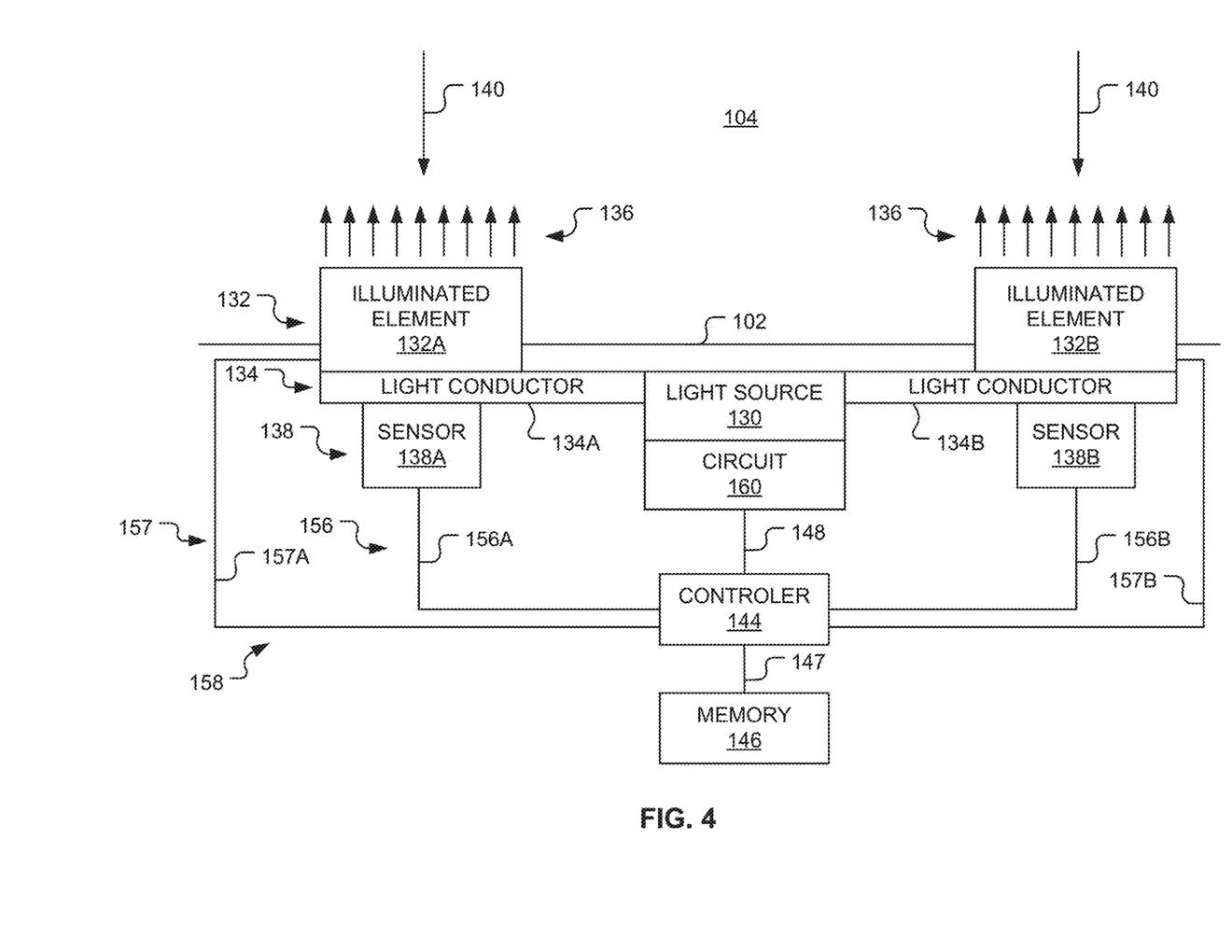
FIG. 4 is a functional block diagram illustrating exemplary internal components of the control panel of FIG. 1.

FIG. 1 illustrates an exemplary user interface or control panel 100 of the type used in an aircraft cockpit 104 (see FIG. 4). In the embodiment illustrated, the control panel 100 has a front face 102 that includes a display 110, a keyboard 112, one or more annunciations 114, and selectable buttons 116.

In the embodiment illustrated, the display 110 is located at or near a center portion 118 of the front face 102. The display 110 may be implemented as a conventional display device, such as a compact Control Display Unit ("CDU"), a liquid crystal display, and the like. For example, the display 110 may be implemented as a compact CDU that displays the information in dual colors and six lines. The CDU may be implemented as a sunlight readable +/−60° vertical and +/−70° horizontal viewable display.

The keyboard 112 may be positioned on the front face 102 below the display 110. The keyboard 112 includes keys 120 that each represents a character (e.g., a number, a letter of the alphabet, a symbol, punctuation, and the like). Each of the keys 120 includes a label 122 that identifies the character represented by the key.

The selectable buttons 116 include one or more line select keys ("LSKs") L1-L12 and one or more function keys F0-F5. The LSKs L1-L12 are positioned on the front face 102 alongside the display 110. The LSKs L1-L6 are used to select lines displayed along a left side portion 124 of the display 110 and the LSKs L7-L12 are used to select lines displayed along a right side portion 126 of the display 110.

The function keys F0-F5 may be positioned on the front face 102 above the display 110. The (ATC) function key F0 may provide access to Air Traffic Services ("ATS") messages displayed by the display 110 as well as to a Controller-Pilot Data Link Communications ("CPDLC") system functions. The (ACARS) function key F1 may allow access to an AOC (Company) menu (not shown) displayed by the display 110, which may be selected to view and/or print a Load Sheet, send a Weather Request or Diversion Report, and to use other Company Defined messages. The (MENU) function key F2 may allow access to a top-level menu (not shown) displayed by the display 110. The (BRT) function key F3 in conjunction with a key 125 (that includes the label 122 displaying "+/−") that allows the user to increase or decrease brightness of the display 110 manually. The (PREV) function key F4 allows the user to page back through menus displayed by the display 110 that include multiple pages or sub-menus. Similarly, the (NEXT) function key F5 allows the user to page forward through such menus.

The annunciations 114 may include annunciations A1-A3. The annunciations A1-A3 are configured to indicate a state of the control panel 100 and/or a device (not shown) to which the control panel 100 is connected. By way of an example, the annunciations A1-A3 may light up to identify a current state. For example, the annunciation A1 (labeled "ATC") may light up when the control panel 100 and/or the device (not shown) to which the control panel 100 is connected is configured to communicate with the CPDLC (or ATC) system. The annunciation A2 (labeled "ACARS") may light up when the control panel 100 and/or the device (not shown) to which the control panel 100 is connected is configured to communicate with ACARS. The annunciation A3 (labeled "FAIL") may light up when the control panel 100 and/or the device (not shown) to which the control panel 100 is connected encounters a failure.

By way of a non-limiting example, the display 110, the annunciations A1-A3, the function keys F0-F5, the LSKs L1-L12, and the keys 120 may be positioned on the control panel 100 in a manner to similar that described in U.S. patent application Ser. No. 15/402,922, filed on Jan. 10, 2017, titled "Aircraft Avionics Data Input Panel," and incorporated herein by reference in its entirety.

Figure 2:
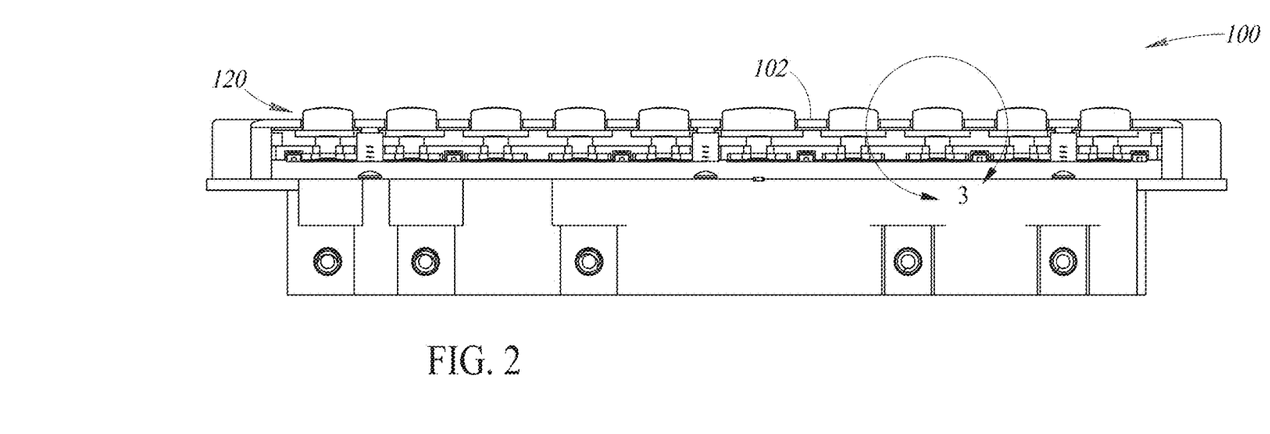
FIG. 2 is a cross-sectional view of the control panel taken through line 2-2 of FIG. 1.

Referring to FIG. 4, the control panel 100 (see FIGS. 1 and 2) includes a light source 130 configured to illuminate illuminated elements 132 of the control panel 100. The light source 130 is positioned behind the front face 102 and the illuminated elements 132, which extend through the front face 102. By way of a non-limiting example, the light source 130 may be implemented as a pulse-width modulated backlight. While the control panel 100 (see FIGS. 1 and 2) has been illustrated and will be described as including the single light source 130, in alternate embodiments, the light source 130 may be implemented as two or more different light sources. Referring to FIG. 1, unlike prior art control panels, the control panel 100 lacks light sensors installed on its front face 102. However, the control panel 100 retains complete automatic brightness control functionality with respect to the light source 130 (see FIG. 4), in response to changing ambient light conditions in the cockpit 104 (see FIG. 4).

Figure 3:
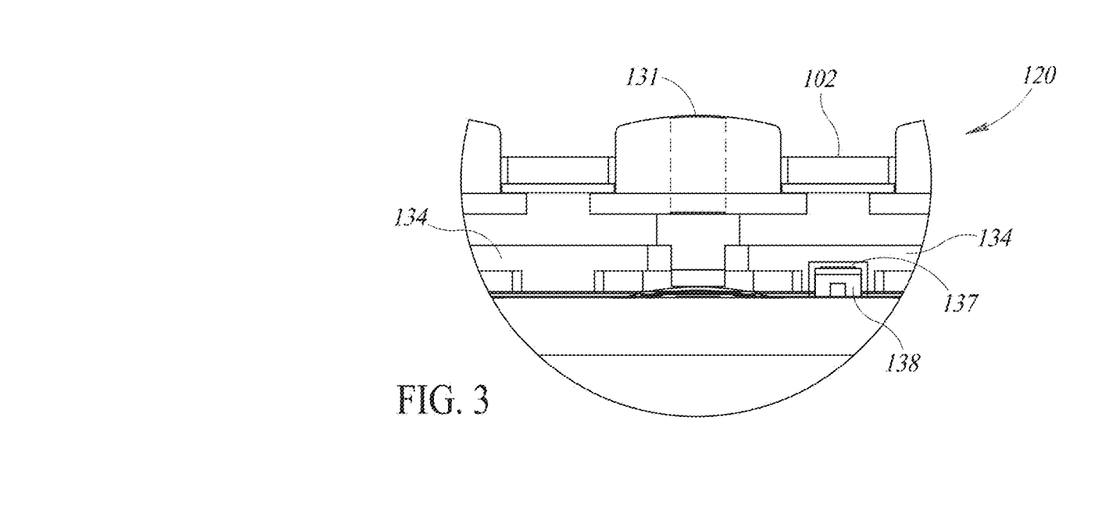
FIG. 3 is an enlarged portion of FIG. 2.

The illuminated elements 132 (see FIG. 4) may include the display 110, the keyboard 112 (e.g., the keys 120 and/or the labels 122), the annunciations 114, and/or the selectable buttons 116. Thus, the light source 130 (see FIG. 4) may backlight the display 110, the keyboard 112 (e.g., the keys 120 and/or the labels 122), the annunciations 114, and/or the selectable buttons 116. Referring to FIG. 4, the light source 130 allows a user to view the illuminated elements 132 even when the cockpit 104 is dark. One or more of the illuminated elements 132 may include a translucent or transparent portion 131 (see FIGS. 1 and 3) through which light may shine.

Light generated by the light source 130 may be conducted to the illuminated elements 132 by one or more optical or light conductors 134 (e.g., one or more light pipes). The light conductor(s) 134 is/are positioned behind the front face 102. In FIG. 4, the light conductor(s) 134 include light conductors 134A and 134B, which conduct light from the light source 130 to the illuminated elements 132A and 132B, respectively. This light shines outwardly into the cockpit 104 through the illuminated elements 132A and 132B as panel generated light 136. By way of a non-limiting example, the panel generated light 136 may shine outwardly through the translucent or transparent portion 131 (see FIGS. 1 and 3) of the illuminated elements 132.

Ambient light sensor(s) 138 are embedded in or positioned near each of the light conductor(s) 134. The ambient light sensor(s) 138 is/are positioned behind the front face 102. Because the ambient light sensor(s) 138 is/are positioned behind the front face 102 and do not extend through the front face 102, the ambient light sensor(s) 138 receive ambient light 140 via the light conductor(s) 134. In the embodiment illustrated, the ambient light sensor(s) 138 include ambient light sensors 138A and 138B embedded in or positioned near the light conductors 134A and 134B, respectively. The ambient light 140 from the cockpit 104 may shine through the illuminated elements 132A and 132B and into the light conductors 134A and 134B, respectively. The ambient light sensors 138A and 138B are positioned to detect a portion of the ambient light 140 shining through the light conductors 134A and 134B, respectively. By way of a non-limiting example, the ambient light 140 may shine through the translucent or transparent portion 131 (see FIGS. 1 and 3) of the illuminated elements 132 and into the light conductor(s) 134.

Thus, in addition to illuminating the illuminated elements 132, the light conductor(s) 134 is/are configured to accommodate light sensing. For example, referring to FIG. 3, each of the light conductor(s) 134 may include an optical feature or recess 137 configured to direct light to one or more of the ambient light sensor(s) 138. For example, referring to FIG. 4, the light conductors 134A and 134B may each include the optical feature or recess 137 (see FIG. 3) configured to direct light to the ambient light sensors 138A and 138B, respectively. Because the light conductors 134A and 134B provide balanced light distribution, there is flexibility on where the ambient light sensors 138A and 138B, respectively, may be located.

The ambient light sensor(s) 138 may take a variety of forms. For example, the ambient light sensor(s) 138 may each be implemented as a photo optical sensor. Ideally, the ambient light sensor(s) 138 should be as physically small as possible, so that their impact on the functionality of the light conductor(s) 134 is minimized. The ambient light sensor(s) 138 must have good low light sensitivity.

Figure 5:
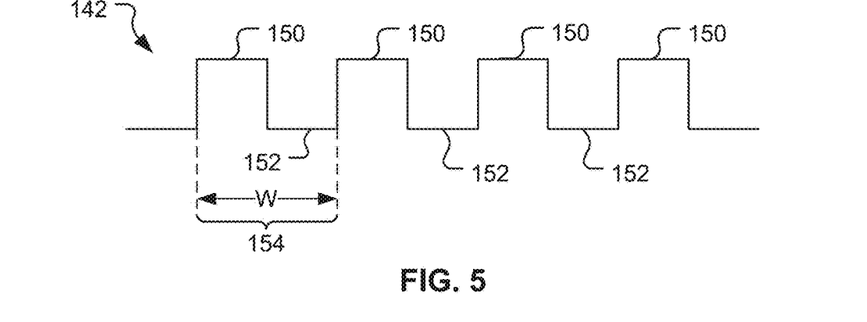
FIG. 5 is illustration of a control signal used to instruct a light source when to turn on and off.

Referring to FIG. 5, the light source 130 (see FIG. 4) is controlled by a variable duty cycle power control signal 142. Referring to FIG. 4, the control signal 142 (see FIG. 5) may be generated by a processor or controller 144 connected to memory 146 by a communication link 147 (e.g., one or more signal conductors). By way of non-limiting examples, the controller 144 may be implemented as a microcontroller, a conventional microprocessor, application specific integrated circuit (ASIC), digital signal processor (DSP), programmable gate array (PGA), or the like. The control panel 100 (see FIGS. 1 and 2) is not limited by the specific form of the controller 144.

The memory 146 may store instructions and data to control operation of the controller 144. The instructions may be executable by the controller 144 and implement portions of one or more of the methods described herein (e.g., a method 200 illustrated in FIG. 6) when executed by the controller 144. The memory 146 may be implemented as one or more non-transitory computer or controller readable media. The memory 146 may include random access memory, ready-only memory, programmable memory, flash memory, and the like. The control panel 100 (see FIGS. 1 and 2) is not limited by any specific form of hardware used to implement the memory 146. The memory 146 may also be integrally formed in whole or in part with the controller 144.

The controller 144 is connected to the ambient light sensor(s) 138 by one or more communication links 156 (e.g., one or more signal conductors). In the embodiment illustrated, the ambient light sensors 138A and 138B are connected to the controller 144 by communication links 156A and 156B, respectively. The ambient light sensor(s) 138 are each configured to send a sensor signal to the controller 144 (via at least one of the communication link(s) 156) encoding a portion of the ambient light 140 detected by the ambient light sensor. The sensor signal may include raw, unfiltered sensor data that is delivered to the controller 144. The sensor signal may be digital, or analog, and may interface through an analog to digital converter or a data bus (e.g., one of the communication link(s) 156).

The controller 144 may be connected to each of the illuminated elements 132 by one or more communication links 157 (e.g., one or more signal conductors). In the embodiment illustrated, the illuminated elements 132A and 132B are connected to the controller 144 by communication links 157A and 157B, respectively. The controller 144 may use the communication link(s) 157 to receive input from the illuminated elements 132 (e.g., selection of one of the illuminated elements 132) and/or to send instructions to the illuminated elements 132 (e.g., to light up or turn off).

The control panel 100 (see FIGS. 1 and 2) may also include conventional components, such as a network interface, a USB interface, Bluetooth interface, wireless components (e.g., a transceiver), a battery, and the like. Such conventional components each operates in a known manner and needs not be described in greater detail. For the sake of clarity, these conventional components are not illustrated in the functional block diagram of FIG. 4.

Various components of the control panel 100 (see FIGS. 1 and 2) may be coupled to the controller 144 by a bus system 158. The bus system 158 may include an address bus, data bus, power bus, control bus, and the like. For example, the bus system 158 may include the communication links 147, 148, 156, and 157.

The controller 144 is connected to the light source 130 by a communication link 148 (e.g., one or more signal conductors). The controller 144 may send the control signal 142 (see FIG. 5) to the light source 130 via the communication link 148. Alternatively, the control signal 142 may be generated by the light source 130 itself. In such embodiments, the control signal 142 may be transmitted by the light source 130 to the controller 144 (e.g., via the communication link 148).

In FIG. 5, the control signal 142 has portions 150 that instruct the light source 130 (see FIG. 4) to turn "ON" (each being referred to as a "duty cycle ON period") and portions 152 that instruct the light source 130 to turn "OFF" (each being referred to as a "duty cycle OFF period"). In other words, the control signal 142 instructs the light source 130 (see FIG. 4) to turn on during the duty cycle ON periods 150 and to turn off during the duty cycle OFF periods 152. Each successive pair of duty cycle ON and OFF periods 150 and 152 may be characterized as being a pulse 154 having a pulse width "W." In FIG. 5, the control signal 142 has been illustrated as a square wave in which the pulse width "W" of each of the pulses 154 are identical. However, the pulse width "W" may be modulated such that the pulses 154 do not have identical pulse widths. Thus, the control signal 142 may be implemented as a pulse width modulated waveform. The light source 130 may include or be connected to a lighting circuit 160 (not shown) configured to respond rapidly to the ON/OFF binary nature of the control signal 142. Light-emitting diode ("LED") and organic light-emitting diode ("OLED") are examples of suitable lighting technologies that may be used to implement the light source 130.

As is apparent to those of ordinary skill in the art, appearant brightness of the light source 130 (see FIG. 4) may vary depending upon the duration of the duty cycle ON periods 150. For example, the light source 130 (see FIG. 4) will appear brighter during those pulses having longer duty cycle ON periods 150 than during those pulses having shorter duty cycle ON periods 150. Thus, by varying the width (or duration) of the duty cycle ON periods 150, the controller 144 (see FIG. 4) controls the appearant brightness of the light source 130 (see FIG. 4).

Figure 6:
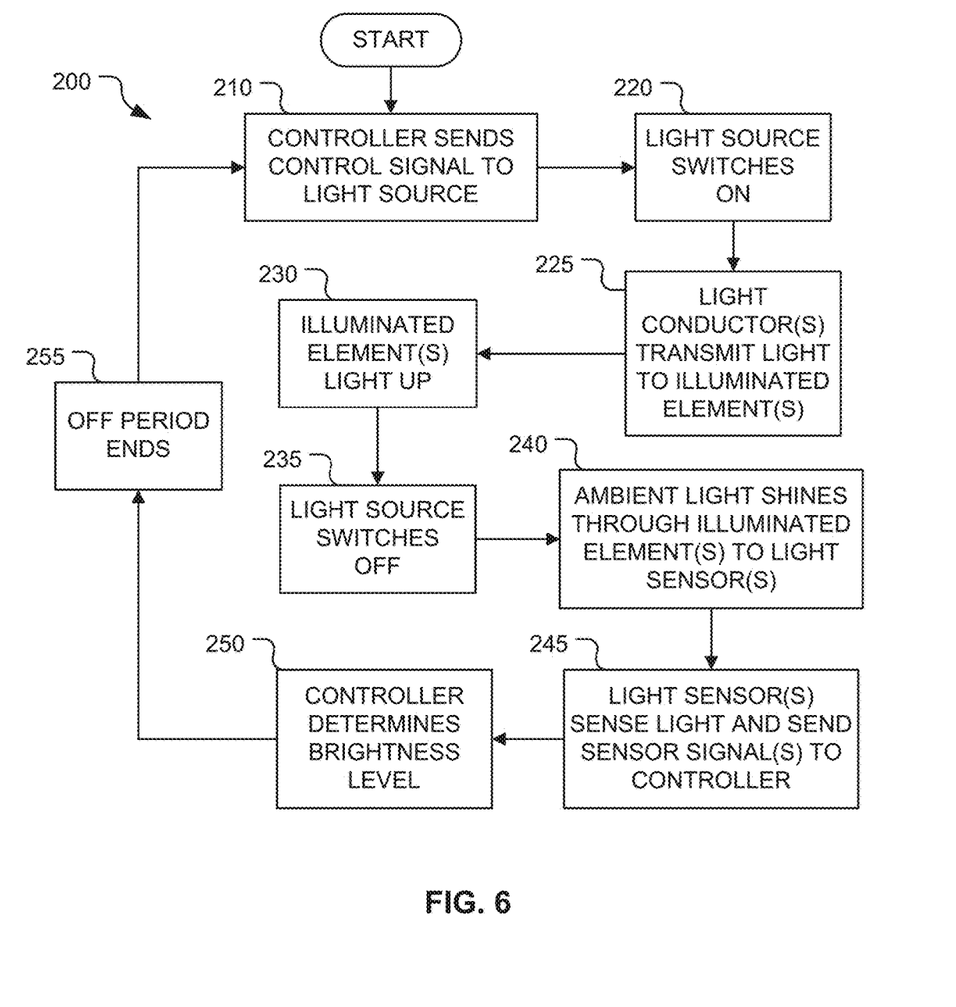
FIG. 6 is a flow diagram of a method performed by the control panel of FIG. 1.

FIG. 6 is flow diagram of the method 200 performed by the control panel 100 (see FIGS. 1 and 2) and used to determine a brightness level of the light source 130 (see FIG. 4). In first block 210, the controller 144 (see FIG. 4) generates the control signal 142 (see FIG. 5) and sends the control signal 142 to the light source 130 (see FIG. 4). The control signal 142 may be sent to the light source 130 (see FIG. 4) via the communication link 148. In this example, referring to FIG. 5, the control signal 142 sent includes the single pulse 154, which includes one of the duty cycle ON periods 150 followed by one of the duty cycle OFF periods 152.

Referring to FIG. 4, in block 220 (see FIG. 6), the duty cycle ON period 150 (see FIG. 5) of the pulse 154 (see FIG. 5) instructs the light source 130 to turn on and generate light.

In this example, the appearant brightness of the light generated is determined by the width (or duration) of the duty cycle ON period 150 (see FIG. 5). In block 225 (see FIG. 6), light generated by the light source 130 propagates through the light conductor(s) 134 and to the illuminated elements 132. In block 230 (see FIG. 6), at least a portion of the light generated by the light source 130 lights up each of the illuminated elements 132 and shines out through the illuminated elements 132 as the panel generated light 136.

When the current duty cycle ON period 150 (see FIG. 5) ends, in block 235, the duty cycle OFF period 152 (see FIG. 5) of the pulse 154 (see FIG. 5) instructs the light source 130 to turn off. In block 240 (see FIG. 6), the ambient light 140 enters the control panel 100 (see FIGS. 1 and 2) through the illuminated elements 132. The ambient light 140 is conducted by the light conductor(s) 134 to one or more of the ambient light sensor(s) 138. In block 245 (see FIG. 6), the ambient light 140 is detected by the ambient light sensor(s) 138 embedded in or positioned near the light conductor(s) 134. The ambient light sensor(s) 138 are each connected to the controller 144 and configured to send a sensor signal to the controller 144 (e.g., via the communication link(s) 156).

In block 250 (see FIG. 6), the controller 144 receives the sensor signal(s) as an input and determines a brightness level based at least in part on the sensor signal(s). The controller 144 may implement a function configured to receive the sensor signal(s) and determine the brightness level based at least in part on the sensor signal(s). The function may be stored in the memory 146 as instructions that are executable by the controller 144. In this example, the brightness level is used to configure a new pulse of the control signal 142 (see FIG. 5). For example, the controller 144 may make the duty cycle ON period 150 (see FIG. 5) of the new pulse longer or shorter depending upon the brightness level.

Then, in block 255 (see FIG. 6), the current duty cycle OFF period 152 (see FIG. 5) ends. Referring to FIG. 6, when the current duty cycle OFF period 152 (see FIG. 5) ends, the method 200 returns to block 210 whereat the controller 144 (see FIG. 4) generates and sends the new pulse to the light source 130. During the duty cycle ON period 150 (see FIG. 5) of the next pulse, the light generated by the light source 130 may have a different apparent brightness. In this manner, the controller 144 controls the apparent brightness of the light source 130 and the control panel 100 (see FIGS. 1 and 2).

The method 200 has been described above as being used with the light source 130 (see FIG. 4) having an apparent brightness that varies depending upon the width (or duration) of the duty cycle ON periods 150. In alternate embodiments, other methods may be used to determine the apparent brightness of the light source 130 (see FIG. 4). For example, a voltage level control may be used to control the apparent brightness of the light source 130. In such embodiments, voltage (e.g., amplitude) of the control signal 142 (see FIG. 5) may vary instead of the width (or duration) of the duty cycle ON period 150 (see FIG. 5). In such embodiments, if necessary, the light source 130 adjusts its apparent brightness based on the brightness level encoded in the control signal 142 (see FIG. 5). Alternatively, the controller 144 may send the new pulse and the brightness level to the light source 130 as two separate signals. In such embodiments, if necessary, the light source 130 adjusts its apparent brightness based on the brightness level encoded in the separate signal.

An example illustrating some of the functionality of the control panel (see FIGS. 1 and 2) will now be described. Referring to FIG. 4, in this example, the light source 130 is implemented as a backlight with a 200 Hz operating frequency. At this operating frequency, the control signal 142 (see FIG. 5) may instruct the light source 130 to switch ON and OFF repeatedly but too fast (e.g., at 200 Hz) for human beings to perceive. In other words, the control signal 142 (see FIG. 5) may instruct the light source 130 to switch ON and OFF about 200 times per second. Such a duty cycle allows the light source 130 to be turned ON for up to about 90 percent of the duty cycle and to be turned OFF about 10 percent of the duty cycle.

Each of the ambient light sensor(s) 138 is configured to measure a portion of the ambient light 140 that enters one of the light conductor(s) 134 via one of the illuminated elements 132 during each of the duty cycle OFF periods 152 (see FIG. 5). Each of the ambient light sensor(s) 138 sends a sensor signal to the controller 144. Thus, the ambient light sensor(s) 138 may be characterized as being synchronized with the control signal 142 (see FIG. 5) (or the duty cycle).

The controller 144 generates the control signal 142 that implements the duty cycle ON periods 150 (see FIG. 5) and synchronously reads the sensor signals received from the ambient light sensor(s) 138 during the duty cycle OFF periods 152 (see FIG. 5). Thus, operations of both the light source 130 and the controller 144 may be synchronized to the control signal 142 generated by the controller 144. As mentioned above, the controller 144 determines the brightness level of the light source 130 based at least in part on the sensor signal(s). The controller 144 configures the next pulse of the control signal 142 (see FIG. 5) such that the light source 130 generates light having the brightness level determined by the controller 144. For example, the controller 144 may change the width (or duration) of the duty cycle ON periods 150 (see FIG. 5) to thereby change the apparent brightness of the light source 130. The light source 130 receives the next pulse encoding the brightness level or the next pulse and brightness level as separate signals. If necessary, in some embodiments, the light source 130 adjusts its apparent brightness based at least in part on the brightness level received from the controller 144.

Figure 7:
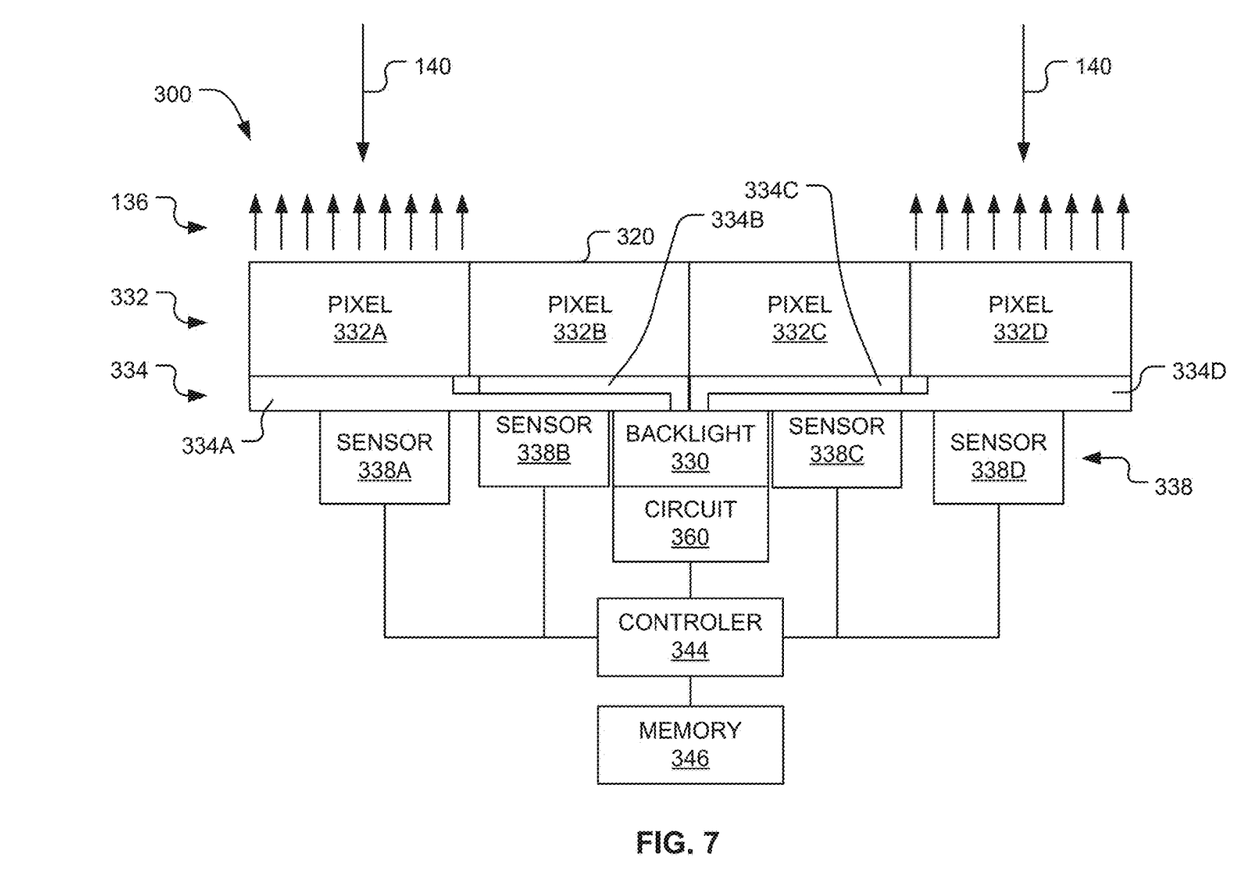
FIG. 7 is an alternate embodiment in which the control panel has been implemented as a display device.

Referring to FIG. 7, while the control panel 100 (see FIGS. 1 and 2) has been described as being for use inside the cockpit 104 (see FIG. 4), in alternate embodiments, the control panel 100 may be implemented as a display device 300, such as a commercial display device, an industrial display device, and the like. Such display devices often use a backlight 330 (e.g., like the light source 130 illustrated in FIG. 4) and one or more optical or light conductors 334 (e.g., like the light conductor(s) 134 illustrated in FIG. 4) to produce a visible display image 320. The display image 320 is composed of pixels 332, which may each be either active or inactive. In the example illustrated, when the backlight 330 is on, pixels 332A and 332D are active or illuminated and pixels 332B and 332C are inactive or not illuminated. However, all of the pixels 332 are inactive when the backlight 330 is off and any of the pixels 332 may be active when the backlight 330 is on.

The backlight 330 is connected to a controller 344 (like the controller 144 illustrated in FIG. 4) that generates the control signal 142 (see FIG. 5). During the duty cycle ON periods 150 (see FIG. 5), light propagates through the light conductor(s) 334 and illuminates the active pixels 332A and 332D. During the duty cycle OFF periods 152 (see FIG. 5), the ambient light 140 enters the inactive pixels 332A-332D and is detected by ambient light sensor(s) 338, which provide sensor signal(s) to a function (e.g., stored as instructions in a memory 346 and implemented by the controller 344). The function controls the apparent brightness of the display device 300 during the duty cycle ON periods 150 (see FIG. 5).

While the display device 300 is displaying the display image 320, at least some of the pixels 332 may be active or illuminated. Performance may be improved by software compensation that determines a percentage of the pixels 332 that are active and uses this percentage to account for a portion of the ambient light 140 that is blocked by the active pixels 332A and 332D.

The backlight 330 is connected to a pulse width modulated lighting circuit 360. For example, with a 200 Hz backlight operating frequency, the backlight 330 is ON for up to about 90 percent of the duty cycle, leaving 10 percent of time when the backlight 330 is OFF. During the 10 percent of the duty cycle when the backlight 330 is OFF, the ambient light sensor(s) 338 are synchronized to measure the ambient light 140 entering the light conductor(s) 334 via the inactive pixels 332A-332D. The backlight 330 may be controlled by the controller 344, which generates the control signal 142 (see FIG. 5) and synchronously reads the sensor signal(s) during the 10 percent duty cycle off time. In this example, the ambient light sensor(s) 338 may have a minimum bandwidth of 10 KHz. The circuit 360 may be configured to respond rapidly to the on/off binary nature of the control signal 142 (see FIG. 5).

The memory 346 may be substantially identical to the memory 146 (see FIG. 4) and may be implemented using any memory suitable for implementing the memory 146. The ambient light sensor(s) 338 may be implemented using any light sensor suitable for implementing the ambient light sensor(s)138 (see FIG. 4). The ambient light sensor(s) 338 may be implemented using small, low-profile light sensors configured to be readily mounted on a display backlight assembly.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A control panel comprising:
a front face;
a light source positioned behind the front face;
a controller configured to generate a control signal and send the control signal to the light source, the control signal instructing the light source when to generate light and when not to generate light;
a keyboard comprising a key extending through the front face;
a light conductor positioned behind the front face and configured to conduct light generated by the light source to the key, the light generated by the light source and conducted by the light conductor illuminating the key, the light conductor being configured to receive ambient light through the key when the light source is not generating light; and
a light sensor positioned behind the front face, the light sensor being configured to receive the ambient light from the light conductor, generate a sensor signal based on the received ambient light, and send the sensor signal to the controller, the controller being configured to determine a brightness level based at least in part on the sensor signal and encode the brightness level in the control signal, brightness of the light generated by the light source being based at least in part on the brightness level encoded in the control signal.

2. The control panel of claim 1, wherein the control signal comprises a series of pulses,
each pulse in the series of pulses has an on period and an off period,
the brightness level is encoded as a width of the on period of a next one of the series of pulses, and
the light source is pulse-width modulated.

3. The control panel of claim 2, wherein the light source is a pulse-width modulated backlight.

4. The control panel of claim 1, wherein the control signal comprises a series of pulses,
each pulse in the series of pulses has an on period and an off period, and
the brightness level is encoded as a voltage level of the on period of a next one of the series of pulses.

5. The control panel of claim 1, wherein the control signal instructs the light source to generate light about 90 percent of a duty cycle and not to generate light about 10 percent of the duty cycle.

6. The control panel of claim 1, wherein the light source is a light-emitting diode.

7. The control panel of claim 1, wherein the sensor signal includes raw and unfiltered data collected by the light sensor.

8. The control panel of claim 1, wherein the key includes a translucent or transparent portion, the light conductor being configured to receive the ambient light through the translucent or transparent portion of the key when the light source is not generating light.

9. A method comprising:
generating, with a controller, a control signal with alternating on and off portions;
sending, with the controller, the control signal to a light source configured to backlight a plurality of keys, the light source turning on and off in response to the alternating on and off portions of the control signal, one or more light conductors conducting light generated by the light source when the light source is on to the plurality of keys, the plurality of keys being illuminated by the conducted light, the one or more light conductors conducting ambient light to one or more light sensors, the ambient light having been received by the one or more light conductors from the plurality of keys when the light source is off;
detecting the ambient light with the one or more light sensors;
generating, with the one or more light sensors, one or more sensor signals based on the detected ambient light and sending the one or more sensor signals to the controller;
determining, with the controller, a brightness level based at least in part on the one or more sensor signals; and
encoding, with the controller, the brightness level in the control signal, brightness of the light generated by the light source being based at least in part on the brightness level encoded in the control signal.

10. The method of claim 9, wherein the brightness level is encoded as a width of a next on portion of the control signal.

11. The method of claim 9, wherein the brightness level is encoded as a voltage level of a next on portion of the control signal.

12. A display device comprising:
a plurality of pixels;
a backlight positioned behind the plurality of pixels;
a controller configured to generate a control signal and send the control signal to the backlight, the control signal instructing the backlight when to generate light and when not to generate light;
at least one light conductor positioned behind the plurality of pixels and configured to conduct light generated by the backlight to active ones of the plurality of pixels to thereby illuminate the active pixels, the at least one light conductor being configured to receive ambient light through at least one of the plurality of pixels when the backlight is not generating light; and
at least one light sensor positioned behind the plurality of pixels, the at least one light sensor being configured to receive the ambient light from the at least one light conductor, generate one or more sensor signals based on the received ambient light, and send the one or more sensor signals to the controller, the controller implementing software compensation that determines a percentage of the plurality of pixels that are active pixels and uses the percentage to account for a portion of the ambient light blocked by the active pixels, the controller being configured to determine a brightness level based at least in part on the one or more sensor signals and encode the brightness level in the control signal, brightness of the light generated by the backlight being based at least in part on the brightness level encoded in the control signal.

13. The display device of claim 12, wherein the control signal comprises a series of pulses,
   each pulse in the series of pulses has an on period and an off period,
   the brightness level is encoded as a width of the on period of a next one of the series of pulses, and
   the backlight is a pulse-width modulated backlight.

14. The display device of claim 12, wherein the control signal comprises a series of pulses,
   each pulse in the series of pulses has an on period and an off period, and
   the brightness level is encoded as a voltage level of the on period of a next one of the series of pulses.

15. The display device of claim 12, wherein the control signal instructs the backlight to generate light about 90 percent of a duty cycle and not to generate light about 10 percent of the duty cycle.

16. The display device of claim 12, wherein the one or more sensor signals include raw and unfiltered data collected by the at least one light sensor.

* * * * *